United States Patent
Rothballer et al.

[11] Patent Number: 5,868,529
[45] Date of Patent: Feb. 9, 1999

[54] MILLING CUTTER

[75] Inventors: Gerhard Rothballer, Lehrberg; Jürgen Maurer, Windsbach, both of Germany

[73] Assignee: Widia GmbH, Essen, Germany

[21] Appl. No.: 817,910

[22] PCT Filed: Oct. 18, 1995

[86] PCT No.: PCT/DE95/01453

§ 371 Date: Apr. 18, 1997

§ 102(e) Date: Apr. 18, 1997

[87] PCT Pub. No.: WO96/12584

PCT Pub. Date: May 2, 1996

[30] Foreign Application Priority Data

Oct. 20, 1994 [DE] Germany .......................... 44 37 426.7

[51] Int. Cl.$^6$ .................................................. B23C 5/24
[52] U.S. Cl. ................................ 407/36; 407/38; 407/46; 407/53; 407/43
[58] Field of Search ................................. 407/36, 35, 37, 407/38, 40, 41, 43, 44, 45, 46, 47, 49, 51, 52, 53, 54, 56, 62

[56] References Cited

U.S. PATENT DOCUMENTS

| | | |
|---|---|---|
| 3,359,612 | 12/1967 | Mina et al. . |
| 3,839,772 | 10/1974 | Shimomura et al. .................. 407/46 X |
| 3,847,555 | 11/1974 | Pegler et al. .......................... 407/46 X |
| 3,946,475 | 3/1976 | Hopkins ..................................... 407/41 |
| 4,264,245 | 4/1981 | Lindsay ..................................... 407/41 |
| 4,995,767 | 2/1991 | Segal ......................................... 407/41 |

FOREIGN PATENT DOCUMENTS

| | | |
|---|---|---|
| 0 024 597 B2 | 3/1981 | European Pat. Off. . |
| 2 1400 004 | 2/1973 | Germany . |
| 2 339 873 | 2/1974 | Germany . |
| 23 39 873 C2 | 2/1974 | Germany . |
| 32 36 921 C1 | 11/1983 | Germany . |
| 34 41 821 A1 | 5/1986 | Germany . |
| 90 17 613.8 | 5/1991 | Germany . |
| 44 37 426 A1 | 4/1996 | Germany . |

OTHER PUBLICATIONS

A New Range of Versatile Indexable–Tip Facing Cutters by W. Astrop, Midlands Editor, Machinery and Production Engineering, 8 Aug. 1973.

*Primary Examiner*—Andrea L. Pitts
*Assistant Examiner*—Henry W. H. Tsai
*Attorney, Agent, or Firm*—Herbert Dubno

[57] ABSTRACT

A cutting mill kit includes a basic body formed with a plurality of peripheral recesses which receive respective cassettes and cutting inserts and an annular support element which is provided with at least one formation receiving a respective gib. The gib provides an axial support for the cassette and has a width lesser than a width of the cassette.

3 Claims, 6 Drawing Sheets

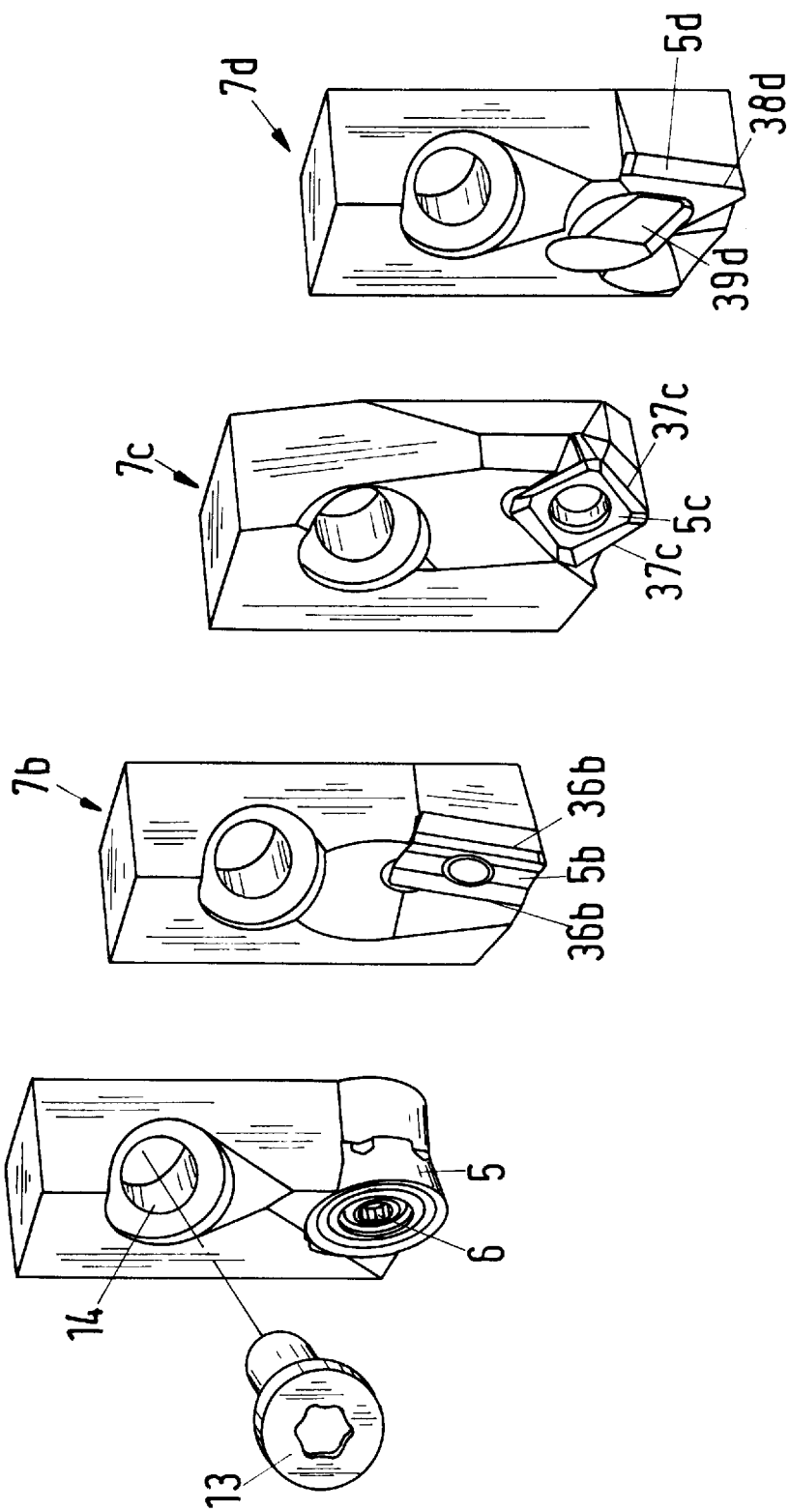

MILLING CUTTER

CROSS REFERENCE TO RELATED APPLICATIONS

This is a national phase application based upon a German application P 44 37 426.7 filed 20 Oct. 1994 and based, in turn, on an International application PCT/DE95/01453 filed 18 Oct. 1995 under the International Convention.

The invention relates to a milling cutter with a basic body and with an annular support element in the form of an emplacement ring for the cassettes with cutters arranged in the basic body.

BACKGROUND OF THE INVENTION

Basically milling cutters of the mentioned kind have been known for a long time. So for instance the DE 32 36 921 C1 describes a milling tool with an emplacement ring and with adjustment elements arranged between the emplacement ring and the cassette ends. Because of further functional elements being arranged therein, the shape and design of the recesses receiving the cassettes are expensive to produce and complicated. The production of the basic body is related to high costs and besides the basic body can only be used for special purposes.

OBJECT OF THE INVENTION

It is the object of the invention to provide the steps for a cost-effective production of a versatile basic body.

SUMMARY OF THE INVENTION

It is characteristic for the basic body of the invention that its channel-like recesses for the cassettes extend from one of its frontal surfaces to the other frontal surface without any projections and/or undercuts, whereby the bottom and walls of each recess receiving the cassettes are flat and smooth. Thereby it is not only possible to achieve a cost-effective production of the basic body itself due to less effort, but also to optimize the shape and design of the cassettes.

According to a further development of the invention, it is provided that to the basic body one or more of the following three annular support bodies be assigned, whereby a first annular support element has on the cassette side a continuous flat frontal surface, whereby in a further annular support element on the cassette side for each cassette a setting element is provided in a recess in the annular support element, whereby the clear width A of the recess is smaller towards the cassette than the width B of the support surface at the ring side end of the cassette and whereby a third annular support element has on the cassette side large contact surfaces for the direct engagement of the ends of respectively several cassettes, and in between respective separate frontally open recesses for adjustment elements, whereby again the clear width A of these recesses is smaller than the width B of the support surface at ring side end of the pertaining cassette.

The width B and the frontal clear width A of the recesses in the annular support element (emplacement ring) are adjusted to each other. This way it is achieved that the cassettes rest against the emplacement ring either in a fixed manner or are axially adjustable with the aid of the setting elements, which preferably are gibs. In this connection it is also finally provided that the setting elements/gibs are assigned only to individual cassettes, so that some cassettes serve for roughing-down machining, while the adjustable cassettes are provided for finishing.

Thus in principle on one and the same basic body three different emplacement rings can be used. A first emplacement ring has adjustment elements for each cassette. A second emplacement ring has no adjustment elements at all and in a third emplacement ring adjustment elements are provided for some, but not for all cassettes. In all cases the basic body remains the same.

BRIEF DESCRIPTION OF THE DRAWING

The above and other objects, features, and advantages will become more readily apparent from the following description, reference being made to the accompanying drawing in which:

FIG. 5 is a perspective view of a cassette provided with a round cutter;

FIG. 6 is a perspective view of a cassette provided with a two cutting edge cutter;

FIG. 7 is a perspective view of a cassette provided with a four cutting edge cutter;

FIG. 8 is a perspective view of a cassette provided with a three cutting edge cutter;

SPECIFIC DESCRIPTION

Figure 1:
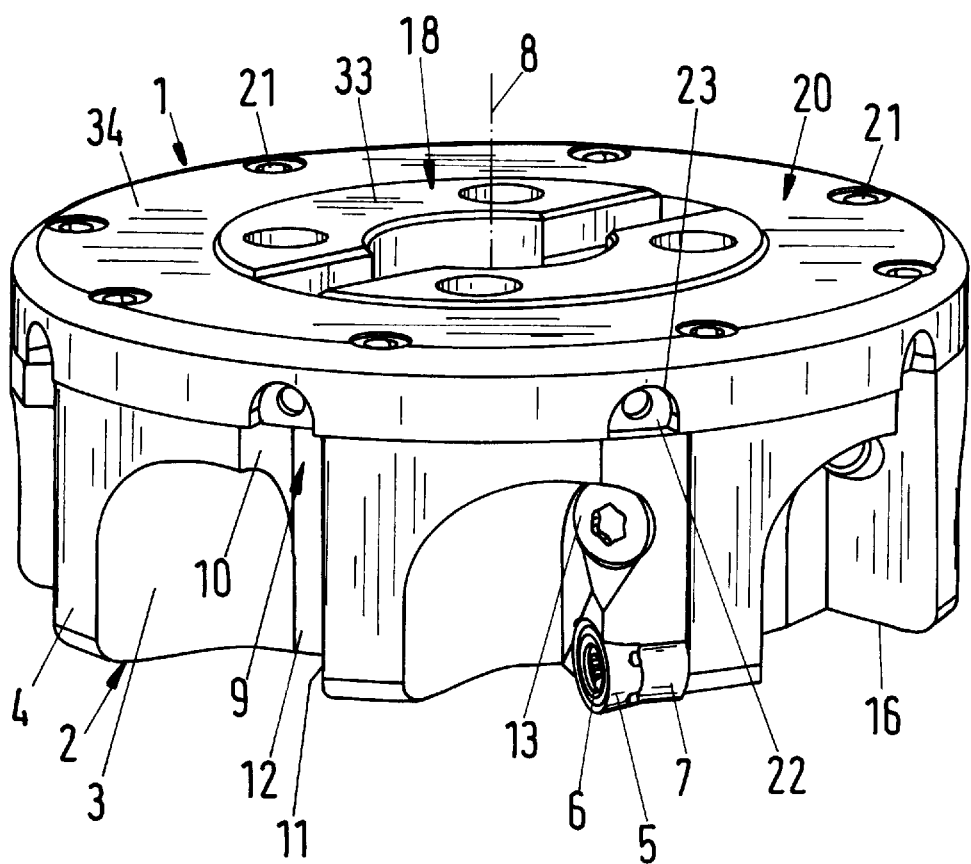
FIG. 1 is a perspective view of the milling cutter.

According to FIG. 1 a milling cutter 1 comprises a basic body 2 with chip spaces 3 at its periphery 4. Further it has cutters 5, e.g. in the form of indexable inserts, which can be affixed by means of fastening elements/screws 6.

The cutters 5 are arranged on cassettes 7. A channel-shaped recess 9 extending parallel to the rotational axis 8 of the milling cutter 1 is provided for each of the cassettes 7 at the periphery 4 of the basic body 2. The walls 10 and 11 and the bottom 12 of the channel-like recesses 9 are flat and smooth, whereby further the walls 10 and 11 are preferably parallel to each other. Further the channel-shaped recesses 9 are open towards the neighboring chip spaces 3, so that the wall 10 running in the direction of rotation is shorter than the other wall 11.

The recesses 9 serve for receiving of cassettes each having a simple prismatic basic shape, or a shape of a simple geometry, as shown in the various embodiment examples illustrated in FIGS. 5 to 8. For the fastening of the cassette fastening elements, for instance fastening screws 13 are provided, which reach through a bore 14' in the respective cassette 7 into a threaded bore 15 the basic body 2.

The cross section of the recess 9 receiving the cassettes 7 is constant over its entire length, whereby only the chip spaces 3 end in these recesses 9. Independently therefrom, the recesses extend without projections or undercuts from the one frontal surface 16 to the other frontal surface 17 of the basic body 2 and run to their full width all the way to the frontal surface 17 opposite to the cutters 5. Therefore the production of the recesses is simple.

An auxiliary part 18 of the basic body 2 rises axially above the frontal surface 17 and lies with its periphery 19 on a smaller radius than that of the bottom 14 of the respective recess (9).

Figure 2:
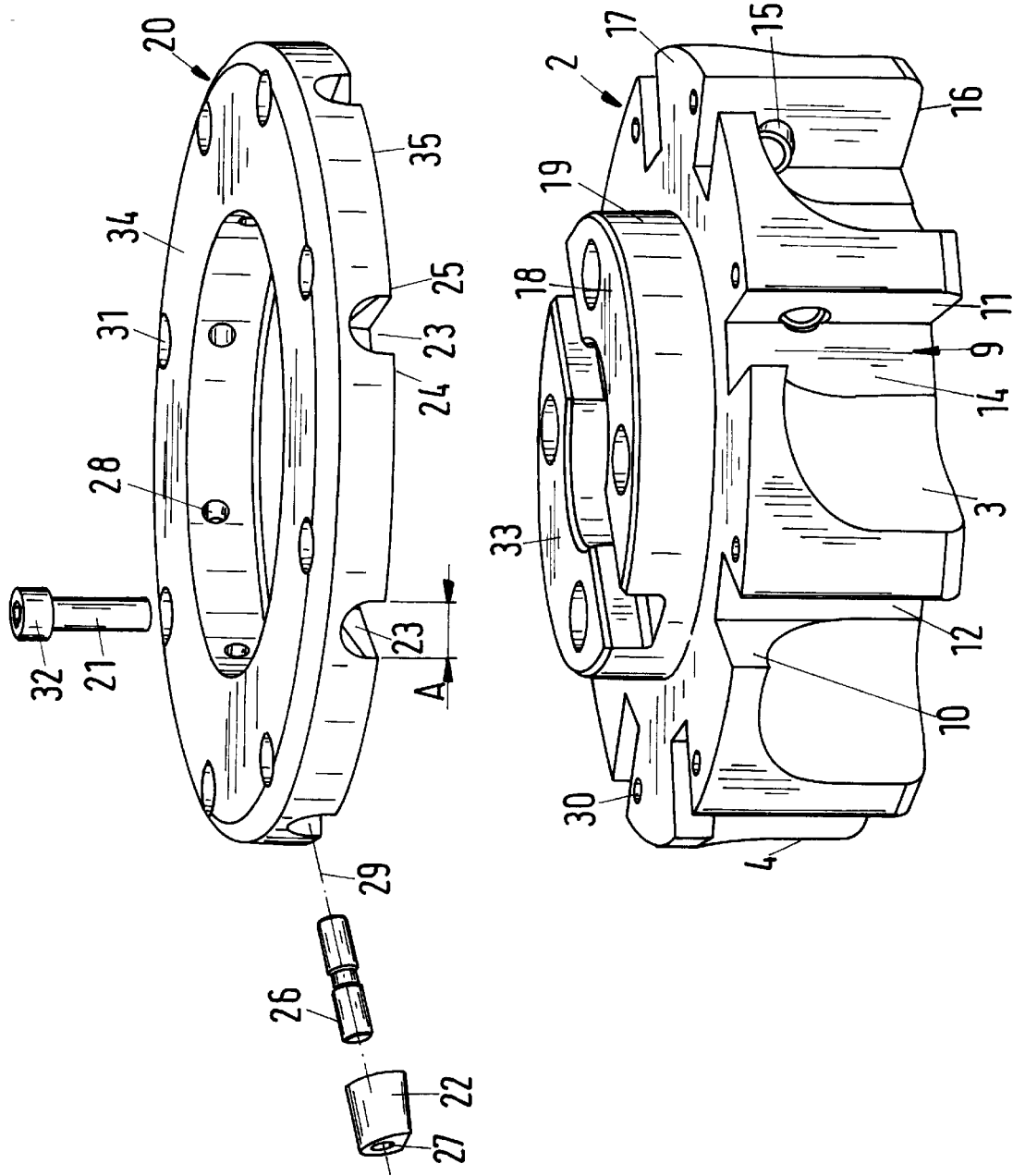
FIG. 2 is a perspective view of the milling cutter at a smaller scale, as well as an exploded view.

As further shown in FIGS. 1 and 2, a support element 20 is provided and several cutters 5 are assigned.

According to the embodiment example the support element 20 is ring-shaped and from the functional point of view an emplacement ring. However it can basically consist also of two or more segments, which respectively reach over two or three recesses 9 and are assigned to several cassettes 7 with cutters 5.

Figure 3:
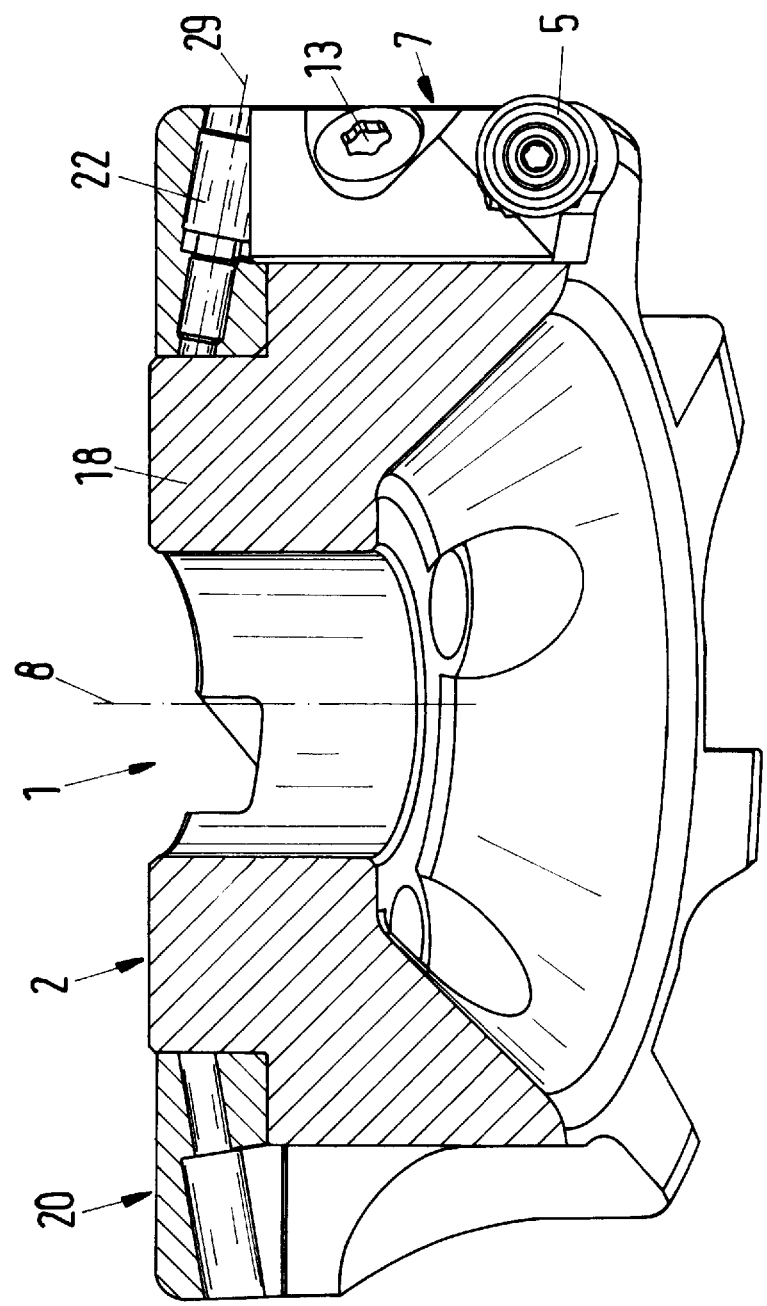
FIG. 3 is a radial section through the milling cutter.

According to the first embodiment shown in FIGS. 1 to 3, the support element 20 is ring-shaped and therefore assigned to all cutters 5. In mounted position the support element 20 closes the recesses 9 in the area of the frontal surface 17 of the basic body 2. For this purpose the annular support element 20 is fastened to the frontal surface 17 by means of screws 21.

In mounted position the cassettes 7 lie flatly with their ends 7' away from the cutters 5 against the support element 20, or against the setting elements 22 arranged on the support element 20, so that the support element 20 can receive the axially oriented cutting forces of cutters 5.

The setting elements 22 are gibs/rounded wedges and are located in radially oriented recesses 23 open towards the contact surfaces 7" of the cassettes 7.

The clear width A of the recesses 23 open towards the cassettes 7 is smaller than the width of the channel-shaped recesses 9 in the basic body 2, respectively or than the corresponding width B of cassettes 7. When the setting elements/gibs 22 are completely inside the recess 23, the cassette 7 rest against the margins 24, 25 of the recess 23, namely in rigidly fixed position.

According to the embodiment, for the adjustment of the setting element/gib 22 serves a double-threaded screw 26, which on the one side engages in a threaded bore 27 in the setting element 22 and further in a threaded bore 28 in the annular support element 20. The axis 29 of the double-threaded screw 26 is slightly inclined with respect to the rotational axis 8 of the milling cutter 1 towards the respective cassette 7 (FIG. 3). The setting element/gib 22 is therefore in a position to serve as a limit stop for the cassette 7 at a precisely defined point in the direction parallel to the axis of rotation 8.

The use of the margins 24 and 25 of the recess 23 formed on the bottom 35 of the support element 20 as a fixed limit stop makes sense particularly when the milling cutter 1 is used for rough machining/rough down operations. In the case of finishing operations and of high requirements of axial runout precision the positioning of the cassettes 7 takes place with the aid of the setting elements/gibs 22.

The screws 21 serving for the fixation of the support element 20 engage in the threaded bores 30 in the basic body running parallell to the axis of rotation 8 and lie in simple offset bores 31 in the annular support element 20 in such a manner that the respective screw head 32 is immersed. The annular support element 20 surrounds with a positive lock the auxiliary part 18 of the basic body 2, whereby the frontal surface 33 of the auxiliary part 18 is at a higher level than the free frontal surface 34 of the support element 20.

Figure 4:
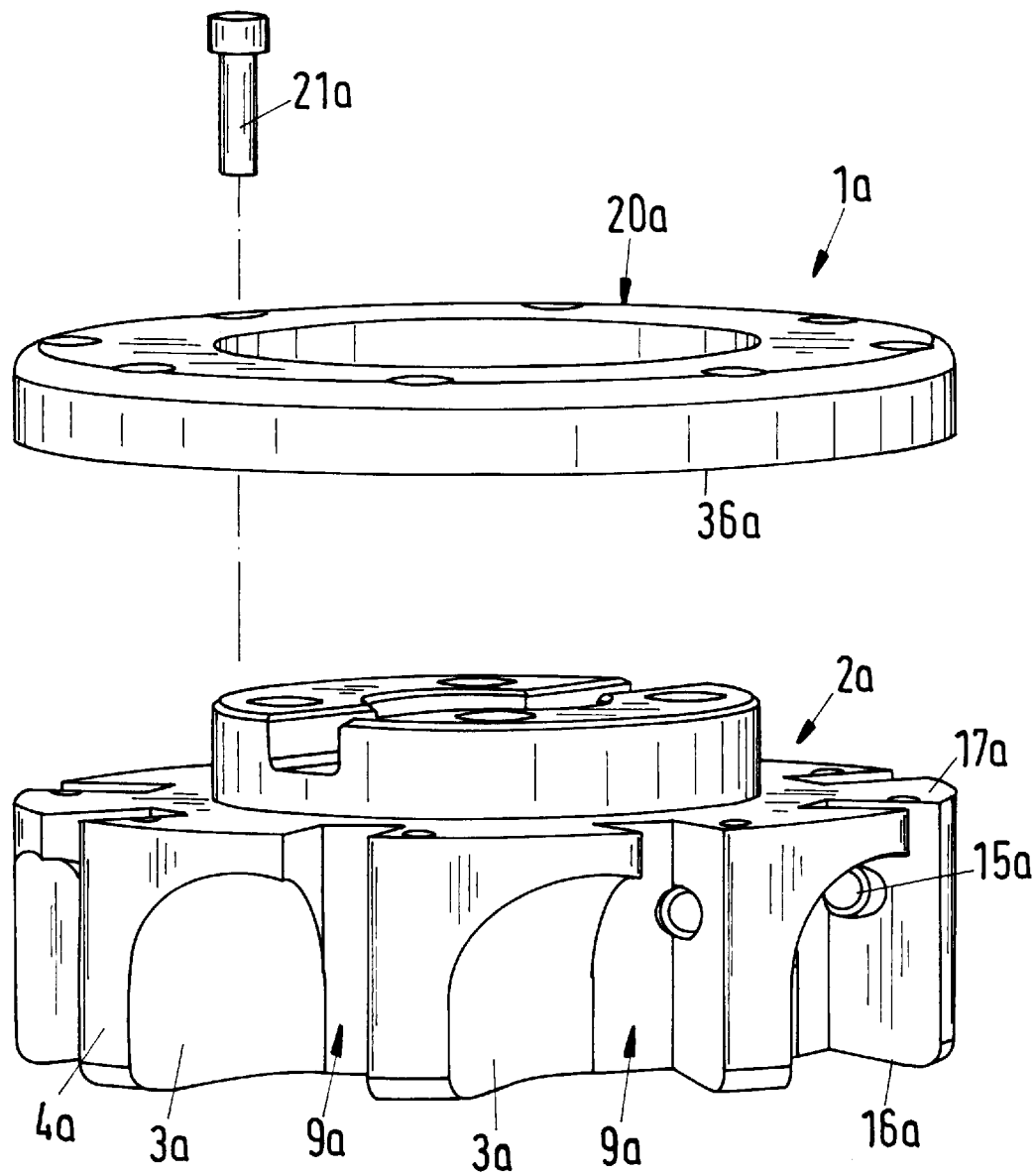
FIG. 4 is an exploded view of the essential parts of a modified milling cutter.

While the milling cutter 1 shown in FIGS. 1 to 3 can be used for finishing as well as rough operations, FIG. 4 relates to an embodiment of a milling cutter 1a which can be used only for rough operations. Essentially similar parts are marked in this embodiment with the same reference numerals as before but with an additional index letter a.

The basic body 2a of the milling cutter 1a is identical to the basic body 2 of the milling cutter 1. The differences consist only in the annular support element 20a, since it lacks the integrated setting elements. Instead the annular support element 20a or the emplacement ring 20a has a continuous and smooth frontal surface 36a facing towards the cassettes respectively and the recesses 9a in the basic body 2. Therefore the cassettes 7 (according to FIG. 2) lie directly and fully against the frontal surface 36a with their contact surfaces 7" at the end 7', corresponding to their total cross section filling the channel-shaped recesses 9a.

A very substantial advantage which can be achieved with the milling cutter, respectively with the milling cutter 1a, consists in that when both milling cutters have the same geometry they can be used in connection with differently acting cassettes and cutters. According to FIG. 5 the cassette 7 is provided with a round cutter 5. According to embodiment example shown in FIG. 6, a cassette 7b with the same geometry can be provided with a cutter 5b in the form of an indexable insert with two parallel cutting edges 36b.

A cutter 5c in the form of an indexable insert with four cutting edges 37c is arranged on the cassette 7c according to FIG. 7. The cutting edges 37c can thereby be at an angle deviating from 90° with respect to the axis of rotation 8 of the milling cutter. In this case the basic shape of the cassette 7c is further reinforced in the area of its free end for receiving the cutters 5c.

Finally FIG. 8 relates to a cassette 7d, on which a cutter 5d having for instance three cutting edges 38d is fastened by means of a clamping device 39d.

Figure 9:
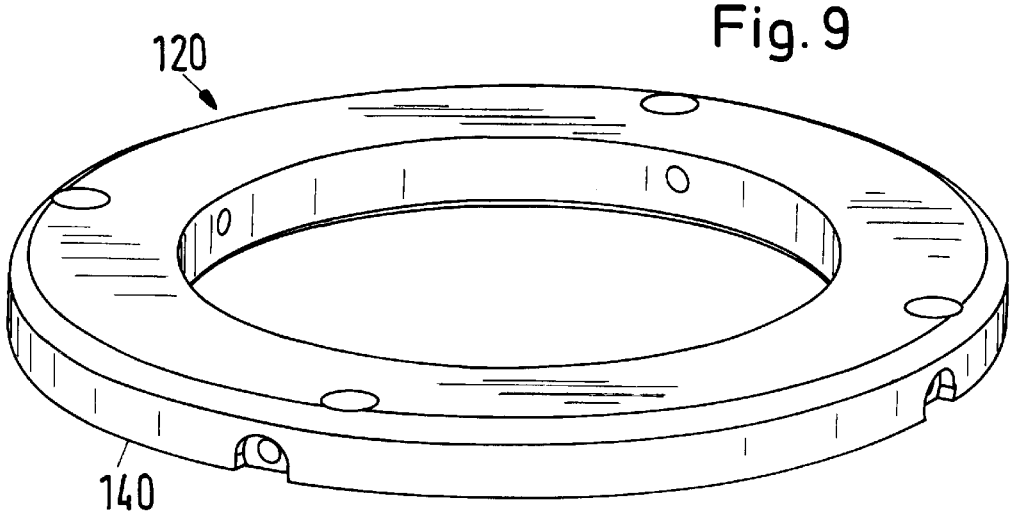
FIG. 9 is a perspective view of another embodiment of the support element according to the invention.
Figure 10:
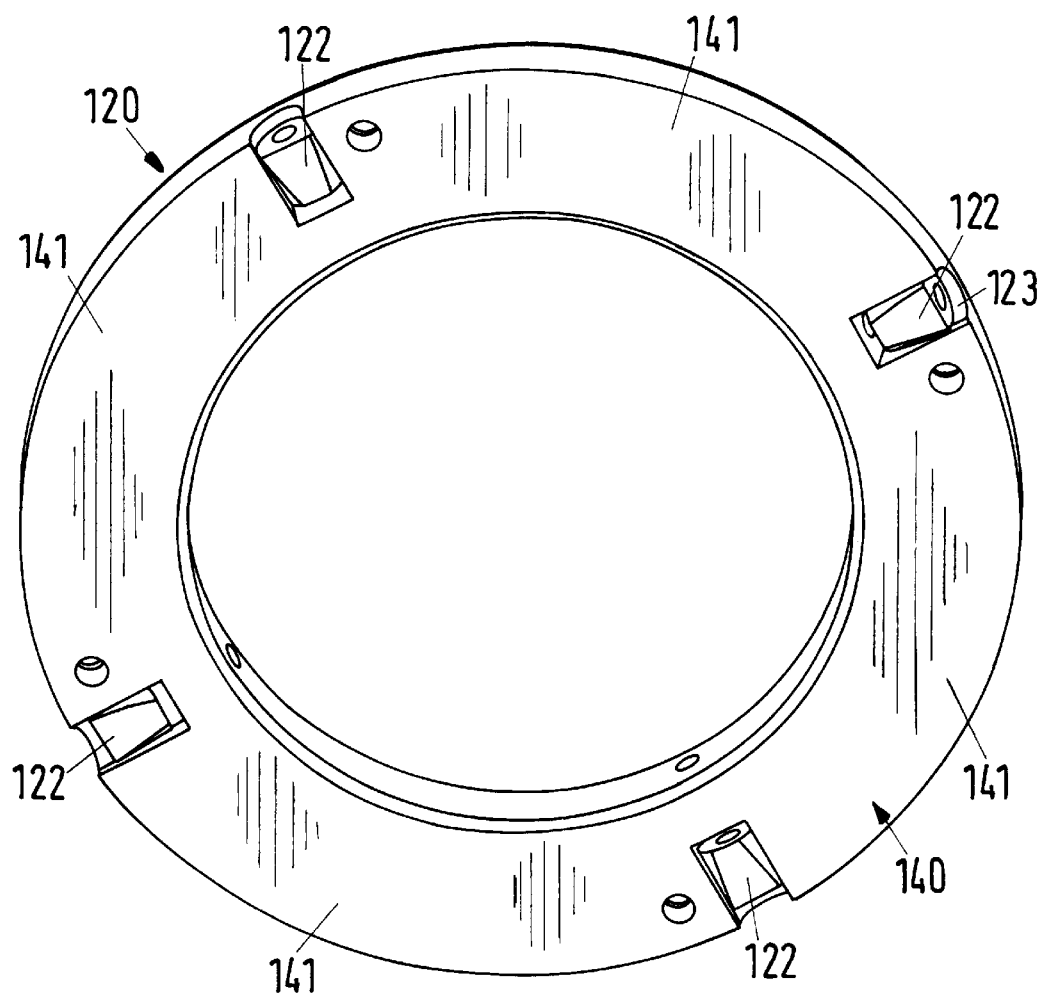
FIG. 10 is another perspective view of the support element shown in FIG. 9.

It is therefore essential that for all applications the identical basic body be usable in connection with cassettes respectively and emplacement rings which are functionally different, which also include the annular support element 120/emplacement ring represented in FIGS. 9 and 10.

The emplacement ring 120 has a frontal surface 140 facing towards the cassettes not shown in the drawing, which with the assistance of radially adjustable setting elements/gibs 122 is subdivided in directly effective stop surfaces 141 for the cassettes. Therefore in the emplacement ring 120 there are fewer setting elements 122 than there are cassettes in a pertaining basic body not shown in the drawing.

The respective limit stop surfaces 141 arranged between the setting elements 122 serve as a fixed limit stop for the cassettes in the basic body. These cassettes can be used for roughing-down. The other cassettes assigned to the setting elements 122 can carry cutters serving for finishing operations and can be set to precise dimensions. A milling cutter with an emplacement ring 120 can therefore be used for two functions without any problems, whereby it can be produced at low cost, since optionally only one recess 123 has to be provided with the threaded bores required for the setting elements 122/gibs.

All other features serving for the fastening of the emplacement ring 120 to the basic body are designed just like in the already previously described embodiment examples.

We claim:

1. A milling cutter comprising:
   a tool body having a shape defining an envelope and rotatable about a rotation axis and formed with a periphery which is defined between a tool front and tool rear surfaces;
   a plurality of spaced angularly apart on said periphery chip spaces extending radially inwardly from the envelope;
   a plurality of angularly spaced apart recesses formed on said periphery and opening toward the chip spaces, each of said recesses being provided with a respective recess bottom spaced inwardly with respect to the envelope and flanked by a respective pair of continuously flat walls which extend axially rearwardly from the tool frontal surface and radially outwardly from the recess bottom to terminate on said envelope;

a plurality of cassettes each received in the respective recess and extending axially rearwardly from the tool frontal surface and being provided with a respective cutter spaced axially from the tool frontal surface;

an annular support formed with a support bottom mounted on the tool frontal surface and formed with at least one cutout which extends radially inwardly from the envelope and is axially aligned with the respective recess and has a width narrower than a width of a frontal face of the respective cassette received in the recess and facing the support bottom, said support bottom being formed with the respective pair of angularly spaced apart margins adjacent to the one cutout and pressing against the frontal face of the cassette;

one gib received in the respective cutout and axially abutting a central region of the frontal face of the cassette bridging said margins; and at least one double-threaded screw extending along a radial path through the gib and support to radially adjust the gib to the support.

2. The milling cutter defined in claim 1 wherein the radial path lies in a plan inclined with respect to the rotation axis.

3. The milling cutter defined in claim 1 wherein the support is formed with another cutout spaced angularly apart from the one cutout and axially aligned with another recess and receiving another gib to abut the central region of the respective cassette received in the other recess.

\* \* \* \* \*